United States Patent Office 3,772,280
Patented Nov. 13, 1973

3,772,280
THIOMORPHOLINE-COUMARIN DERIVATIVES
Rudi Beyerle, Bruchkobel, Ingerburg Lydia Katharina Stachel, Frankfurt am Main-Fechenheim, Rolf-Eberhard Nitz, Bergen-Enkheim, and Klaus Resag and Eckhard Schraven, Frankfurt am Main-Fechenheim, Germany, assignors to Cassella Farbwerke Mainkur Aktiengesellschaft, Frankfurt am Main-Fechenheim, Germany
No Drawing. Original application Jan. 8, 1969, Ser. No. 789,919, now Patent No. 3,652,557, dated Mar. 28, 1972. Divided and this application July 27, 1971, Ser. No. 166,599
Claims priority, application Germany, Jan. 19, 1968, P 16 68 877.0
Int. Cl. C07d 99/10
U.S. Cl. 260—243 B        3 Claims

ABSTRACT OF THE DISCLOSURE

The present invention relates to new coumarin compounds useful as coronary dilators and having the formula

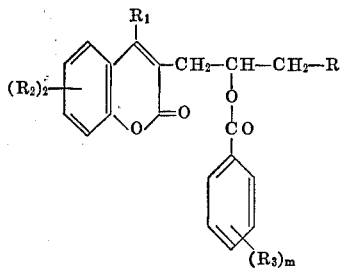

or the hydrochloric acid addition salts thereof, and to methods of preparing the same either by acylating, in the presence of acid-binding agents, if desired, coumarin derivatives having the formula

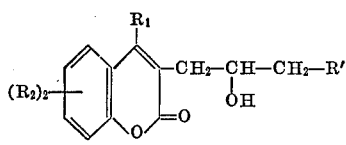

with acylating agents selected from the group consisting of alkoxybenzoic acid having the formula

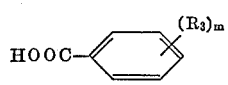

and functional derivatives thereof, or by condensing, in the presence of acid-binding agents, if desired, coumarin derivatives having the formula

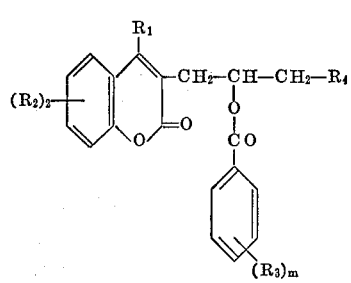

with an amine having the formula RH, wherein R is thiomorpholino, which is bound via its nitrogen atom; $R_1$ is selected from the group consisting of alkyl radicals having 1–4 carbon atoms and phenyl; $R_2$ is selected from the group consisting of 5,7-, 6,7- and 7,8-positioned alkoxy groups having 1–4 carbon atoms; $R_3$ is selected from alkoxy groups having 1–4 carbon atoms; $R_4$ is selected from the group consisting of chlorine and bromine; $R'$ is thiomorpholino, which is bound via its nitrogen atom; and $m$ is selected from the group consisting of 1, 2, and 3.

The present application is a division of our U.S. Ser. No. 789,919, filed Jan. 8, 1969, now U.S. Pat. No. 3,652,557, issued Mar. 28, 1972.

The present application relates to new pharmacologically valuable, basically substituted coumarin compounds having the formula

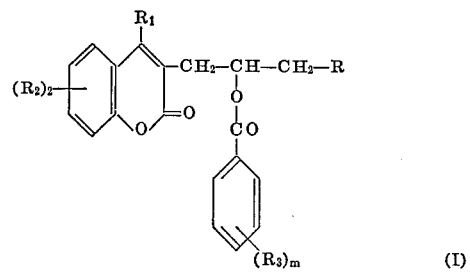

or the hydrochloric acid addition salts thereof, wherein R is thiomorpholino which is bound via its nitrogen atom; $R_1$ is selected from the group consisting of alkyl radicals having 1–4 carbon atoms; $R_2$ is selected from the group consisting of 5,7-, 6,7-, and 7,8-positioned alkoxy groups having 1–4 carbon atoms; $R_3$ is selected from alkoxy groups having 1–4 carbon atoms; and $m$ is selected from the group consisting of 1, 2, and 3.

The coumarin compounds according to the present invention are obtained in the different known per se methods, the method chosen depending on the envisaged constitution of the final product.

The simplest method of obtaining the coumarin compounds according to the present invention is to acylate, optionally in the presence of an acid-binding agent, a coumarin derivative having the formula

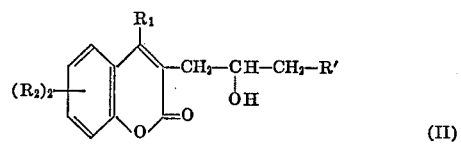

wherein $R'$ is thiomorpholino which is bound via its nitrogen atom, with an alkoxybenzoic acid having the formula

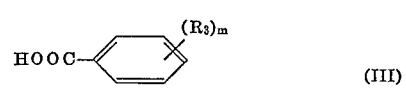

or with a functional derivative thereof.

The 3-γ-amino-β-hydroxy-propyl-coumarins required as starting materials for this process are obtained by reacting according to the known methods, for instance analogously to the teachings of British Pats. 1,067,626 and 1,135,907, the corresponding amines with the 3-γ-halogen-β-hydroxy-propyl-coumarins, or with the corresponding 3-(2′,3′,-epoxypropyl)-coumarins.

Another method of preparing the compounds of the present invention which have the General Formula I consists in that coumarin derivatives of the general formula

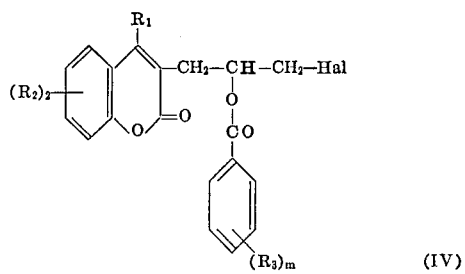

wherein Hal stands for a halogen atom are reacted, optionally in the presence of an acid-binding agent, with an amine of the general formula RH.

Particularly used as amines or bases having the general formula RH are all compounds mentioned above in connection with the definition of the radical R.

The starting materials of the general Formula IV are obtained by acylating the corresponding 3-γ-halogen-β-hydroxy-propyl-coumarins with an alkoxybenzoic acid of the general formula

or with a functional derivative thereof. The reaction may be performed in the presence or absence of an inert solvent and possibly in the presence of an acid-binding agent.

As low-molecular alkyl radicals $R_1$ and alkoxy radicals $R_2$ or $R_3$ are used particularly those having 1–4 carbon atoms.

The coumarin derivatives obtainable under the present invention are valuable pharmaceutics. In particular, they are excellent coronary dilators and, in this respect, superior to other known substances having such properties. Their salts are colorless, crystalline substances that easily dissolve in water.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schraper, R. Xhonneux, and J. M. Bogaard "Uber die kontinuierliche Messung des Sauerstoffdruckes in venösen Coronarblut" (Naunyn-Schmiedeberg's Arch. exp. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Lübbers "Die Messung des Sauerstoffdruckes in Gasen and Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparation was tested in the form of its dihydrochloride:

| Preparation | $LD_{50}$, g./kg., mouse | Dosage, mg./kg., i.v. | Maximal increase in oxygen tension in the coronary veinous blood | | Maximal change in the heart rate | | Maximal change in the blood pressure (systolic/diastolic) | |
|---|---|---|---|---|---|---|---|---|
| | | | In percent | In minutes | In percent | In minutes | In percent | In minutes |
| 3-[γ-thiomorpholino-β-(3,4,5-trimethoxybenzoxy)-propyl]-4-methyl-7,8-dimethoxy-coumarin | | 0.5 | +78 | >35 | −5 | >35 | −17/−28 | 20 |

In the preparation of dragées and tablets containing as essential active ingredient the coumarin derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the coumarin derivatives are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying example which is of an illustrative rather than a limiting nature. Unless otherwise stated, all temperatures given are in degrees centigrade.

EXAMPLE 37.9 g. (0.1 mol) 3 - [γ - thiomorpholino - β - hydroxypropyl]-4-methyl-7,8-dimethoxy-coumarin are suspended, with the addition of 12.1 g. (0.12 mol) triethylamine, in 240 cc. anhydrous toluene. Subsequently, a solution consisting of 27.6 g. (0.12 mol) 3,4,5-trimethoxybenzoylchloride in 130 cc. anhydrous toluene is added while stirring at room temperature and the reaction mixture is heated to 80°. Stirring is continued for 12 hours at this temperature. The toluene solution is sucked off, while hot, from the separated triethylamine hydrochloride and the filtrate is evaporated to dryness in vacuo. The residue is dissolved in methylene chloride. The methylene chloride solution is washed with dilute aqueous sodium hydroxide solution and subsequently with water and then freed from the solvent in vacuo. The residue is recrystallized from ethyl acetate. In order to precipitate the hydrochloride, the base thusly obtained is dissolved, with gentle heating, in ethyl acetate and then admixed with etheric hydrochloric acid until congo paper turns blue. Obtained is the 3-[γ-thiomorpholino-β-3,4,5-trimethoxybenzoxy - propyl] 4-methyl-7,8-dimethoxy-coumarin hydrochloride in the form of colorless needles melting at 208°–211°. Yield: 48 g.=78.8% of the theoretical.

The 3 - [γ - thiomorpholino - β - hydroxy-propyl]-4-methyl-7,8-dimethoxy-coumarin required as starting material may be prepared according to the following process: 31.3 g. (0.1 mol) 3-(γ-chloro-β-hydroxy-propyl)-4-methyl-7,8-dimethoxy-coumarin, prepared according to the method described in British Pat. 1,135,907, Example 2, para 2, and 30.9 g. (0.3 mol) thiomorpholine are dissolved in 300 cc. chlorobenzene and, after the addition of 12.7 g. (0.12 mol) sodium carbonate, heated while stirring to 120°. Stirring is continued for 12 hours at this temperature and then the reaction mixture is sucked off, while hot, from the inorganic salts. The filtrate is evaporated to dryness in vacuo and, for further purification, the residue thusly obtained is recrystallized from ethyl acetate. Obtained is the 3-[γ-thiomorpholino-β-hydroxypropyl]-4-methyl-7,8-dimethoxy-coumarin in the form of colorless crystals melting at 157°. Yield: 27 g.=86.3% of the theoretical.

What is claimed is:
1. A coumarin compound having the structural formula

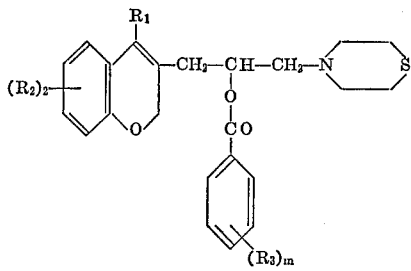

or the hydrochloric acid addition salts thereof, wherein
$R_1$ is selected from the group consisting of alkyl radicals having 1–4 carbon atoms;
$R_2$ is selected from the group consisting of 5,7-, 6,7-, and 7,8-positioned alkoxy groups having 1–4 carbon atoms; and
$R_3$ is selected from alkoxy groups having 1–4 carbon atoms; and
$m$ is selected from the group consisting of 1, 2, and 3.

2. Coumarin compound according to claim 1, wherein $R_1$ is methyl; $R_2$ is methoxy; $R_3$ is methoxy; and $m$ is 3.

3. 3-[γ-thiomorpholino - β - (3,4,5-trimethoxybenzoxy) propyl]-methyl-7,8-dimethoxy-coumarin.

References Cited
UNITED STATES PATENTS
3,467,675   9/1969   Petersen et al. ____ 260—243 B
3,534,085   10/1970  Narayanan et al. __ 260—243 B RICHARD J. GALLAGHER, Primary Examiner